J. P. FOX.
SIGN.
APPLICATION FILED MAY 12, 1920.
1,381,983.
Patented June 21, 1921.
2 SHEETS—SHEET 1.
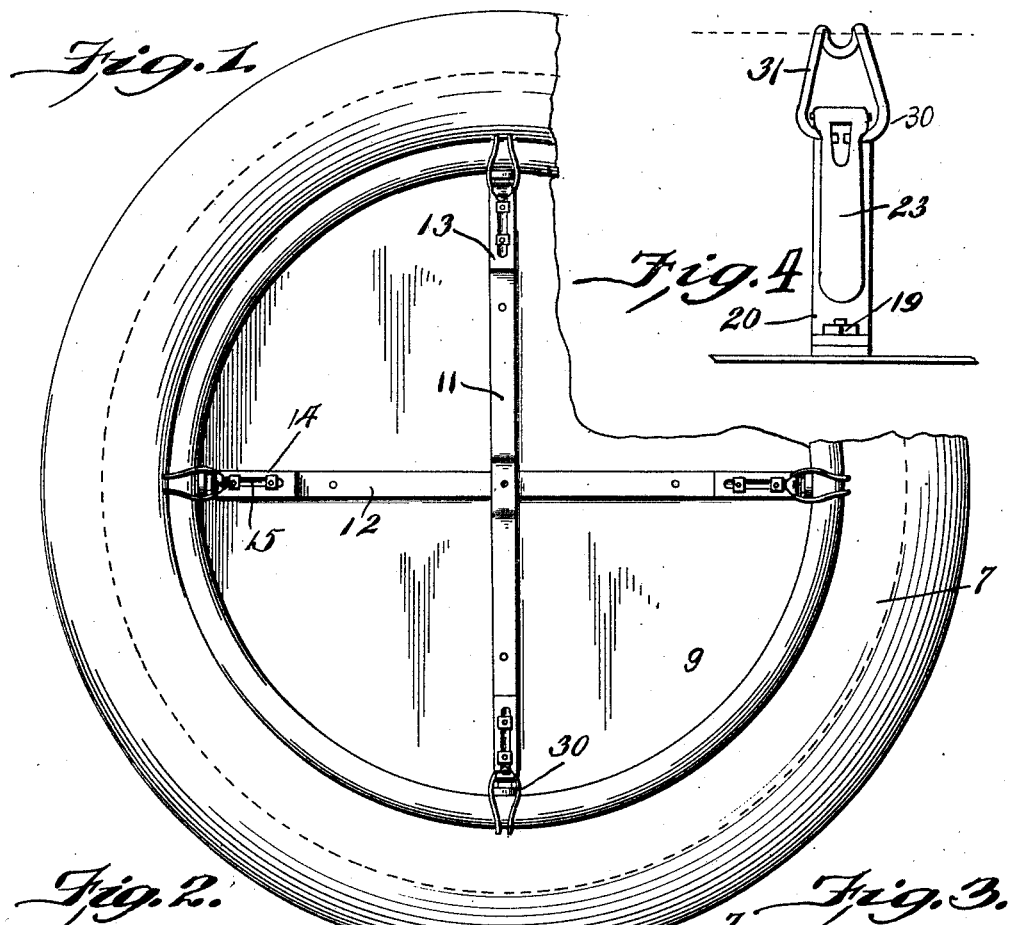
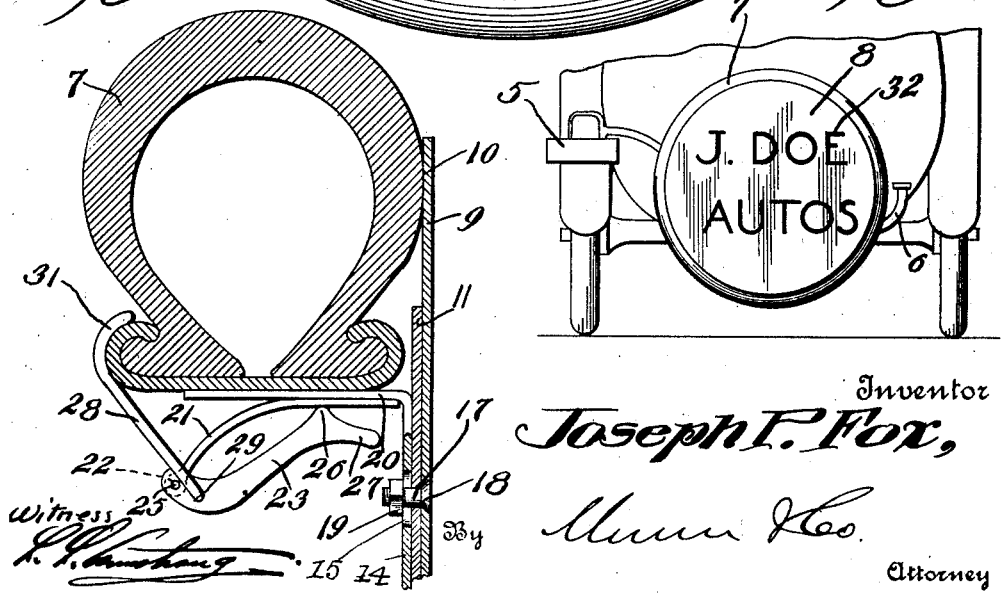
Inventor
Joseph P. Fox,
By Munn & Co.
Attorney

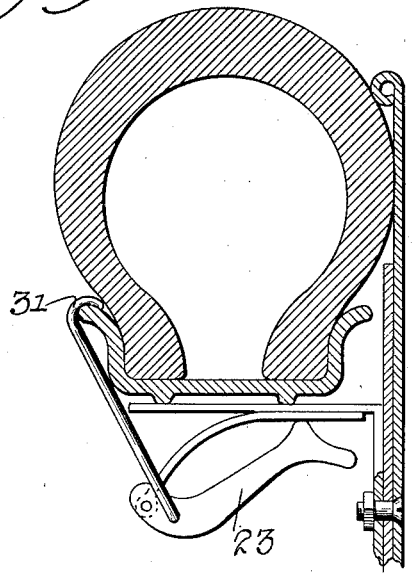
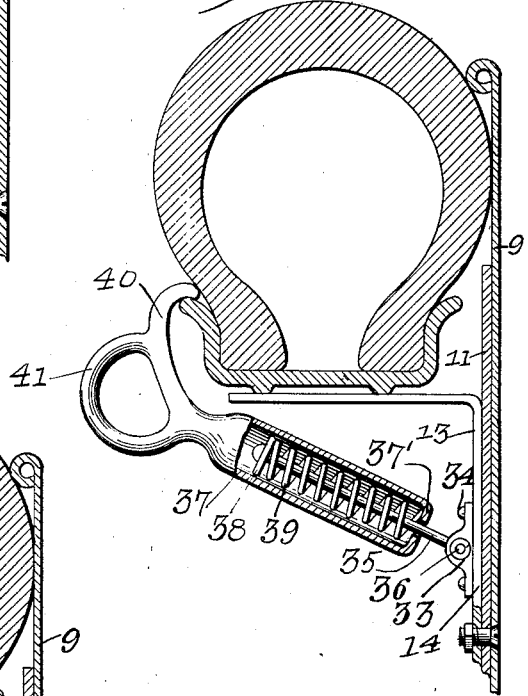
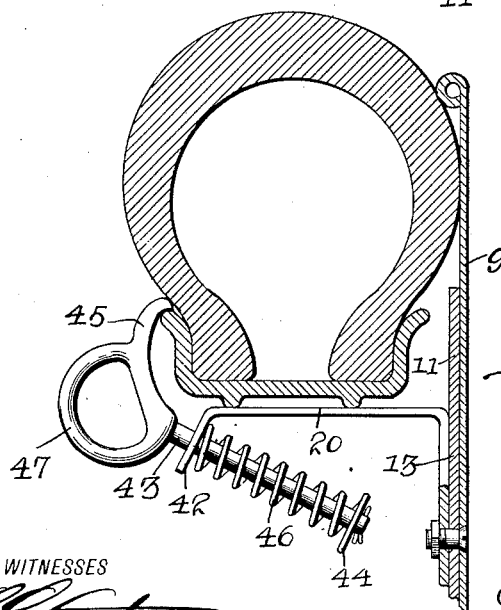

UNITED STATES PATENT OFFICE.

JOSEPH PETER FOX, OF ST. CLOUD, MINNESOTA.

SIGN.

1,381,983.                Specification of Letters Patent.     Patented June 21, 1921.

Application filed May 12, 1920. Serial No. 380,742.

*To all whom it may concern:*

Be it known that I, JOSEPH PETER FOX, a citizen of the United States, and a resident of St. Cloud, in the county of Stearns and State of Minnesota, have invented certain new and useful Improvements in Signs, of which the following is a specification.

The present invention relates generally to signs, and more particularly to an improved sign carrier especially adapted for use with automobiles or similar vehicles.

The object of my invention is to provide an improvement of this character which may be releasably mounted upon the extra wheel or tire generally carried upon the automobile so as to display advertising matter or other intelligence by means of suitable characters carried by the sign.

Another object is to provide an improvement of this character which may be easily adjusted so as to be adapted for use with various sized wheels which may be securely or releasably fastened in position on the wheel.

Another object is to provide an improvement of this character of simple and durable construction, reliable in operation and easy and inexpensive to manufacture.

Other objects and advantages reside in certain novel features of construction, combination and arrangement of parts, which will be hereinafter more fully described and particularly pointed out in the appended claims, reference being had to the accompanying drawings forming part of this specification and in which:

Figure 1 is an elevational view of the rear of a tire or wheel with the sign carrier attached;

Fig. 2 is a transverse sectional view, parts being shown in elevation for the sake of illustration;

Fig. 3 is a rear elevational view, showing my improvement mounted upon the automobile;

Fig. 4 is a vertical detail view of the operating lever and its associated structure;

Fig. 5 is a transverse sectional view of my invention employed with a different form of rim, parts being shown in elevation for the sake of illustration;

Fig. 6 is a similar view of a modified form; and

Fig. 7 is a similar view of another modified form.

Referring to the drawings, it will be seen that the invention contemplates an automobile or other vehicle, indicated generally at 5. An extra wheel or tire carrier, indicated generally at 6, is mounted upon the automobile. This tire carrier is usually arranged upon the rear of the automobile but it may and sometimes is arranged upon the side of the automobile. This carrier serves as a support for an extra tire or wheel or extra rim and tire, indicated generally at 7. This structure herein above described is common and well known in the art and does not require detail explanation.

The improved sign constituting my invention is indicated generally at 8, and is arranged upon the exposed face of the extra wheel or tire and almost completely covers the same, as shown in Fig. 3. This sign consists of a disk 9 preferably of metallic material. The portion of the underface of the disk adjacent the periphery thereof is throughout its circumferential extent upon the side of the tire, as shown at 10, in Fig. 2. Straps 11 of metallic construction, preferably rectangular in cross section are secured to the under-face of the disk 9. These straps are preferably two in number and extend diametrically of the disk and at right angles to each other. The straps overlap at the center of the disk, and the extremities of the straps terminate short of the surface of the disk adapted to engage the tire at 10. The means for securing the straps to the disk may comprise rivets or any like means, as indicated at 12.

A bracket engaged generally at 13 is slidably mounted on each of the extremities of each of the straps 11, whereby these brackets may be adjusted radially with respect to the disk. These brackets comprise a base 14 having an elongated slot 15 therein. The shank 17 of a bolt 18 which has its head seated in the disk 9 extends through the strap and through the slot 14 of the base of the bracket, the outer threaded end of the shank receiving a nut 19 which is adapted to be turned into binding engagement with the base of the bracket to maintain the bracket in adjusted position. If desired two of such bolts and nuts may be provided, as shown in Fig. 1. The base of the bracket is extended to form a lateral arm 20, preferably at right angles to the base and which engages the under side of the felly of the wheel or the rim of the tire as the case may be. The bracket being adjustable, the lateral arms may be adjusted to position to engage the under of the rim irrespective of the size thereof, as the slots 15 are of sufficient length to provide for the requisite range of adjustment.

A depending arm 21 of resilient metal is fastened to the under side of each of the lateral arms 20. This depending arm extends outwardly and downwardly, as shown in Fig. 2 and the outer end of the arm is forged to constitute a pivot bearing or fulcrum 22. An operating lever indicated generally at 23 has one end thereof bifurcated, as at 24, shown in Fig. 4, the arms of the bifurcation receiving between them the pivot bearing 22 and a suitable pivot bolt 25 extending between the alined apertures provided in the bearing in the arms of the bifurcated portion of the lever. The lever is curved, as shown in the drawings, and has a foot lug 26 formed thereon and engageable with the under side of that portion of the depending portion which is fastened to the lateral arm when the operating lever is in the locked position. The lever is also provided with a grasping portion 27.

Adjacent the fulcrum 22, the hook 28 is pivotally secured to the lever. This hook is preferably constructed of one piece of metal having its ends seated in suitable recesses provided in the operating lever, as shown at 29, and then bent to form a loop consisting of spaced arms 30 and the loop has its outer end bent to form a hook 31, which is adapted to engage the tire-engaging flange remote from the disk, as shown in Fig. 2 or to engage a similar part of the wheel. It is to be noted that as shown in Fig. 2, the arrangement of the pivotal connection of the hook to the operating lever and of the fulcrum of the operating lever to the depending arm that when the hook 31 is engaged with the tire engaging flange and the operating lever has been swung over to locked position, as shown in Fig. 2, that the pivotal connection 29 will be swung past the fulcrum 22 and that the pull on the hook will tend to increase the locking action. The arm 21 being constructed of resilient metal constitutes a spring which serves to resiliently connect the hook 21 to the sign carrier, that is, it provides a spring connection between the hook and the sign carrier.

The exposed face of the disk carries advertising matter, indicated at 32, or any characters suitable to convey the desired intelligence.

As shown in Fig. 5 my invention may be employed with the form of rim in which the tire engaging flanges extend outwardly away from the tire as well as with tires of the clencher type.

In the form of the invention shown in Fig. 6, the base 14 of the bracket 13 is provided with a boss 33 which is preferably separable from the base of the bracket, being secured thereto by fastening means 34. An arm 35 has one of its ends pivotally secured to the boss 33, as at 36, and is operatively mounted in a cylinder 37. The end of the arm 35 disposed within the cylinder 37 carries a head 38 which is received within the cylinder 37 for sliding movement therein. A coil spring 39 is mounted upon the arm within the cylinder 37 and resists outward movement of the cylinder as this coil spring engages the head 38 and the cap 37' of the cylinder which cap if desired may be made removable. The free end of the cylinder carries the hook 40 which is preferably integrally formed with the cylinder and which is adapted to engage the rim of the wheel, as clearly shown in the drawings. A finger grip or handle 41 is integrally formed with the hook 40 constituting operating means for the hook.

In the form of my invention shown in Fig. 7 the lateral arm 20 of the bracket 13 is provided with a depending portion 42 which is preferably arranged at the outer extremity of the lateral arm 20 and is integrally formed therein. This depending portion 42 is provided with a suitable opening which slidably receives the arm 43 carrying the head 44 at its upper end and the hook 45 at its inner end. A coil spring is interposed between the head 44 and the depending portion 42 and serves to resist motion of the hook 45 away from the depending portion 42. A handle or finger grip 47 is provided for manipulating the hook and constitutes operating means therefor.

In practice, in order to mount the sign on a vehicle, it is necessary first to adjust the brackets so that the lateral arms thereof engage against the inner face of the rim.

In the form of my invention shown in Figs. 1 to 5, the hook is then placed to engage the flange and the operating lever is swung to the position shown in Figs. 2 and 5. This draws the disk snug against the tire, as shown and securely locks the parts in position. These operations may be carried out before or after the tire or wheel is mounted on its carrier. When it is desired to remove or replace the sign it is only necessary to release the operating lever 24 and the parts may be readily dismounted. Moreover, the sign may be removed and a substitute provided in its place by simply detaching the nuts 19, and removing the disk with its straps and replacing it with another disk as will be apparent.

In the forms of my invention shown in Figs. 6 and 7 it is only necessary to snap the hooks 40 or 45 over the tire engaging flange of the rim and the device is securely maintained in place. Moreover, it may be readily released by grasping the finger grips 47 or 41, as the case may be, and pulling the hook away from the flange against the action of the coil spring.

These embodiments of my invention and especially the form shown in Fig. 7 are especially adapted to be mounted upon the wheel or tire as the same has been placed on the vehicle, as the hooks 45 are adapted to snap automatically into place.

I claim:

1. In a sign of the character described, a sign carrier adapted to be mounted on the extra wheel or tire carried on the automobile and consisting of a disk adapted to carry the characters to be exhibited and arranged upon the exposed face of the tire, a diametrically extending metallic strap secured to the under face of the disk, a radially adjustable bracket carried on the strap, and having a lateral arm, means for securing said bracket in adjusted position, a depending arm arranged upon the lateral arm and provided at its outer extremity with a pivot bearing, an operating lever having one end fulcrumed to the bearing of said depending arm and a hook pivoted to said operating lever adjacent said fulcrum and engageable with a tire whereby the pull on said hook maintains the operating lever in locked position, all as and for the purposes set forth.

2. In a sign of the character described, a plurality of radially adjustable brackets having lateral arms, means for securing said brackets in adjusted position, a depending arm arranged upon the lateral arm and provided at its outer extremity with a pivot bearing, an operating lever having one end fulcrumed to the bearing of said depending arm and a hook pivoted to said operating lever adjacent said fulcrum and engageable with the tire whereby the pull on said hook maintains the operating lever in locked position, all as and for the purposes set forth.

3. In a sign of the character described, a sign carrier adapted to be mounted on the extra wheel or tire carried on the automobile and consisting of a disk adapted to carry the characters to be exhibited and arranged upon the exposed face of the tire, a radially adjustable bracket carried on the disk, and having a lateral arm, means for securing said bracket in adjusted position, a depending arm arranged upon the lateral arm and provided at its outer extremity with a pivot bearing, an operating lever having one end fulcrumed to the bearing of said depending arm, and a hook pivoted to said operating lever adjacent said fulcrum and engageable with a tire whereby the pull on said hook maintains the operating lever in locked position, all as and for the purposes set forth.

4. In a sign of the character described, a sign carrier adapted to be mounted on the extra wheel or tire carried on the automobile and consisting of a disk adapted to carry the characters to be exhibited and arranged upon the exposed face of the tire, radially adjustable brackets carried by the disk, each having a lateral arm engageable with the tire, a depending arm carried by said lateral arm and provided at its outer extremity with a pivot bearing, an operating lever having one end fulcrumed to the bearing of said depending arm, and a hook pivoted to said operating lever and engageable with the tire, all as and for the purposes set forth.

5. In a sign of the character described, a sign carrier adapted to be mounted on the extra wheel or tire carried on the automobile and consisting of a disk adapted to carry the characters to be exhibited and arranged upon the exposed face of the tire, and radially adjustable brackets carried by the disk, each having a lateral arm, a depending arm carried by said lateral arm and provided at its outer extremity with a pivot bearing, and means fulcrumed on said pivot bearing for retaining the disk in position on the tire.

6. In a sign of the character described, a sign carrier adapted to be mounted on the extra wheel or tire carried on the automobile and consisting of a disk adapted to carry the characters to be exhibited and arranged upon the exposed face of the tire, a radially adjustable bracket carried by the disk having a lateral arm engageable with the tire, a depending arm carried by said lateral arm and provided at its extremity with a pivot bearing, an operating lever having one end bifurcated and provided with apertures to aline with said bearing, a pivot bolt extending through said apertures and through said bearing, and a hook pivotally connected to said operating lever and engageable with the tire, all as and for the purposes set forth.

7. In a sign of the character described, a sign carrier adapted to be mounted on the extra wheel or tire carried on the automobile and consisting of a disk adapted to carry the characters to be exhibited and arranged upon the exposed face of the tire, a radially adjustable bracket carried by said disk having a lateral arm, a depending arm carried by said lateral arm and provided at its outer extremity with a pivot bearing, an operating lever having one end fulcrumed on said pivot bearing, and a hook formed of a single piece of metal having its ends pivotally mounted on said operating lever and bent to form spaced arms and having its outer end curved to form a tire-engaging portion, all as and for the purposes set forth.

8. In a sign of the character described, a sign carrier adapted to be mounted on the extra wheel or tire carried on the automobile and including an arm carried by the sign carrier, a hook connected to the arm and adapted to engage the wheel or tire, and a spring resiliently resisting movement of the hook away from the sign carrier and thereby maintaining the hook in engagement with the wheel or tire.

9. In a sign of the character described, a sign carrier adapted to be mounted on the extra wheel or tire carried on the automobile and including a disk, an adjustable bracket carried by the disk, a hook engageable with the extra wheel or tire, spring means resiliently connecting the hook to the bracket, and operating means for said hook.

10. In a sign of the character described, a sign carrier adapted to be mounted on the extra wheel or tire carried on the automobile and including a disk, an adjustable bracket carried by the disk, a hook engageable with the extra wheel or tire, and spring means resiliently connecting the hook to the bracket.

11. In a sign of the character described, a sign carrier adapted to be mounted on the extra wheel or tire carried on the automobile and including a hook adapted to engage the extra wheel or tire and spring means connecting the hook and the sign carrier.

12. In a sign of the character described, a sign carrier adapted to be mounted on the extra wheel or tire carried on the automobile and consisting of a disk, radially adjustable brackets carried by the disk and engageable with the tire for positioning the disk, and means carried by said brackets and engageable with the wheel or tire for retaining the disk in position on said tire.

JOSEPH PETER FOX.